United States Patent
Ohno et al.

(10) Patent No.: US 8,702,560 B2
(45) Date of Patent: Apr. 22, 2014

(54) CONSTRUCTION MACHINE

(75) Inventors: Kousaku Ohno, Mito (JP); Hidetoshi Satake, Ishioka (JP)

(73) Assignee: Hitachi Construction Machinery Co., Ltd., Tokyo (JP)

( * ) Notice: Subject to any disclaimer, the term of this patent is extended or adjusted under 35 U.S.C. 154(b) by 141 days.

(21) Appl. No.: 13/498,935

(22) PCT Filed: Oct. 7, 2010

(86) PCT No.: PCT/JP2010/067653
§ 371 (c)(1),
(2), (4) Date: May 16, 2012

(87) PCT Pub. No.: WO2011/043421
PCT Pub. Date: Apr. 14, 2011

(65) Prior Publication Data
US 2012/0220420 A1 Aug. 30, 2012

(30) Foreign Application Priority Data
Oct. 7, 2009 (JP) .................................. 2009-233491

(51) Int. Cl.
*B60W 10/02* (2006.01)
(52) U.S. Cl.
USPC ............................................................. 477/5
(58) Field of Classification Search
USPC ................. 477/5, 3, 7, 8; 475/5; 180/65.265, 180/65.21, 65.1
See application file for complete search history.

(56) References Cited

U.S. PATENT DOCUMENTS

| | | | | |
|---|---|---|---|---|
| 6,048,289 A * | 4/2000 | Hattori et al. | ................... | 477/15 |
| 6,053,842 A * | 4/2000 | Kitada et al. | ...................... | 477/5 |
| 6,083,138 A * | 7/2000 | Aoyama et al. | ................... | 477/5 |
| 6,083,139 A * | 7/2000 | Deguchi et al. | ................... | 477/5 |
| 6,155,954 A * | 12/2000 | Itoyama et al. | ................... | 477/5 |
| 6,296,593 B1 * | 10/2001 | Gotou et al. | .................. | 477/176 |
| 8,506,449 B2 * | 8/2013 | Yoshida et al. | ................... | 477/5 |
| 2011/0092334 A1 * | 4/2011 | Baino et al. | ...................... | 477/5 |

FOREIGN PATENT DOCUMENTS

| | | |
|---|---|---|
| JP | 2005-12902 | 1/2005 |
| JP | 2005-133319 | 5/2005 |
| JP | 2007-146620 | 6/2007 |
| JP | 2007-228721 | 9/2007 |
| JP | 2008-280796 | 11/2008 |

* cited by examiner

*Primary Examiner* — David D Le
*Assistant Examiner* — David J Hlavka
(74) *Attorney, Agent, or Firm* — Antonelli, Terry, Stout & Kraus, LLP.

(57) ABSTRACT

[Object]
Motorization of a running gear of a construction machine traveling on wheels is realized without enormous increases in vehicle-body dimensions and costs.
[Solution Means]
A wheeled excavator 41 includes travel wheels 10, 11 installed in a vehicle body, an engine 3, a running motor-generator 15, an inverter 21 and a battery 22 which are electrically connected to the motor-generator 15, a hydraulic pump 4 driven by the engine, and a power transmission mechanism which transmits power among the engine 3, the wheels 10, 11, the running motor-generator 15, and the hydraulic pump 4. A clutch 23 which connects and disconnects the power transmission between the engine 3 and the wheels 10, 11 is provided in the power transmission mechanism. In a required area on the vehicle body, a clutch switching means is mounted for switching the clutch 23 to a disengaged state during a level road run and to an engaged state during a downhill run.

9 Claims, 6 Drawing Sheets

CONSTRUCTION MACHINE

TECHNICAL FIELD

The present invention relates to construction machines comprising an electric running gear and, more particularly, to techniques to improve performance of an electric running gear mounted on a construction machine running on wheels, such as a wheeled excavator.

BACKGROUND ART

In recent years, as measures against environmental issues, a steep rise in the price of crude oil and the like, the tendency to pursue energy conservation in various industrial products has been accelerated. Accordingly, an improvement in environmental protection characteristic and/or an improvement in energy conservation characteristic, such as achieved by motorization or hybridization, have come to be also required of conventional construction machinery most of which drives a hydraulic pump with the aid of an engine to drive a hydraulic actuator by pressure oil ejected from the hydraulic pump.

Hybridization of the running gear of the construction machine makes it possible to start a generator by use of the engine to charge a battery when the engine produces surplus power, and to use power of the battery to drive an electric motor so that the drive force of the electric motor assists the drive force of the engine when the construction machine is operated at torque exceeding the capacity of the engine. As a result, engine downsizing can be achieved, leading to improved fuel efficiency of the engine, a reduction in emission, a reduction in noise. Further, a regenerative electric power regenerated by the motor can charge the battery during braking, so that effective use of energy can be made. In this respect, energy conservation in the construction machine can be also achieved.

In the related art, a construction machine in which a parallel hybrid drive unit with a parallel connection of an engine and a motor-generator is applied to a hydraulic pump which is a load is proposed (see, for example, Patent Literature 1). In the technique described in Patent Literature 1, the input shaft of the hydraulic pump is connected through a differential to the output shaft of the engine and the output shaft of the motor-generator, and while the engine is operated at most-efficient rated engine speed, the RPM of the hydraulic pump is designed to be freely changed in order to adjust the flow rate. Also, the pump is allowed to be driven by the motor-generator alone without a clutch provided on the output shaft of the engine.

FIG. 7 shows an example of well-known typical wheeled excavators. As seen from FIG. 7, the wheeled excavator of the example includes a machine room 1 rotatably mounted on the top of a chassis 2 which supports front wheels 10 and rear wheels 11 for running. The machine room 1 incorporates an engine 3, a hydraulic pump 4 driven by the engine 3, and an oil tank 25 storing hydraulic fluid used by the hydraulic pump 4. In front of the machine room 1, front members including a boom 12, an arm 13 and a bucket 14 are coupled in series. The machine room 1 is turned relatively to the chassis 2 by supplying pressure oil ejected from the hydraulic pump 4 to a swing hydraulic motor which is not shown. The front members are driven by supplying pressure oil ejected from the hydraulic pump 4 to hydraulic cylinders which are not shown.

A running hydraulic motor 24 and a transmission 6 connected to the hydraulic motor 24 are placed in the chassis 2, and a propeller shaft 7, which extends from the transmission 6 in the fore-and-aft direction of the vehicle body, transfers the power to a front differential 8 and a rear differential 9 coupled respectively to the front wheels 10 and the rear wheels 11. The running hydraulic motor 24 is rotated by pressure oil supplied from the hydraulic pump 4 through a piping joint 38 disposed at the center of rotation of the machine room 1. The torque of the motor 24 is transferred from the transmission 6 through the propeller shaft 7, the front differential 8 and the rear differential 9 to the front wheels 10 and the rear wheels 11, whereby the wheeled excavator 41 runs. The oil pressure with a pressure reduced by driving the running hydraulic motor 24 travels back to the oil tank 25 provided in the machine room 1 through the piping joint 38.

CITATION LIST

Patent Literature

Patent Literature 1: JP-A No. 2008-280796

SUMMARY OF INVENTION

Technical Problem

The parallel hybrid drive unit described in Patent Literature 1 does not have a significant disadvantage when it is applied to a construction machine which is not designed to allow for long distance running such as a hydraulic shovel. However, when the parallel hybrid drive unit is applied to a construction machine such as a wheeled excavator which is equipped with the front wheels 10 and the rear wheels 11 so as to allow for long distance running, there is a need to allow for running on a long downhill, giving rise to a problem of how to ensure a braking force in this condition.

Specifically, when the wheeled excavator runs by a drive force of the motor-generator alone, brakes are applied by only a power which the motor-generator is able to regenerate. However, the power required for application of brakes reaches several times the power required for running. Because of this, to obtain the braking force necessary for the construction machine of heavy weight to run on a long downhill by the motor-generator requires a large motor-generator which is unnecessary for running, resulting in an increased size and higher cost of the construction machine. Also, even if such a large motor-generator can be mounted, when the battery is fully charged, an enormous regeneration resistor is required for discarding the surplus power, leading to a further increase in vehicle dimensions and a further increase in manufacturing cost, resulting in absolute difficulty to achieve practical use.

The present invention has been made in light of such disadvantages in the related art, and an object thereof is to provide motorization of a construction machine running on wheels without enormous increases in vehicle dimensions and cost.

Solution to Problem

To attain this object, the present invention provides a construction machine which includes: wheels for running which are mounted on a vehicle body; an engine; a motor-generator having two functions as a generator and a motor; a capacitor electrically connected to the motor-generator; a hydraulic pump driven by the engine; and a power transmission mechanism that performs power transmission between the engine and the motor-generator, power transmission between the motor-generator and the wheels, and power transmission between the engine and the hydraulic pump, wherein the power transmission mechanism that performs the power transmission between the engine and the motor-generator includes a clutch and clutch switching means that switches the clutch between an engaged state and a disengaged state, and when the clutch switching means is used to switch the clutch to the engaged state, a drive force of the wheels is transferred to the engine and the hydraulic pump through the power transmission mechanism, so that engine braking by the engine and a hydraulic brake force by the hydraulic pump are obtained for deceleration of the wheels.

With this structure, by switching the clutch provided in the power transmission mechanism to the engaged state during a downhill run, not only the regenerated power of the motor-generator, but also engine braking and a hydraulic brake force generated by the hydraulic pump can be effectively used as a brake force of the construction machine. Accordingly, the braking performance of a construction machine equipped with a parallel hybrid drive unit can be enhanced without a motor-generator with significant power.

In the present invention, the clutch switching means includes clutch drive means that drives a movable component of the clutch, regenerated electric-power detection means that detects the presence/absence of regenerated electric power regenerated at the motor-generator, and a controller that outputs, to the clutch drive means, a clutch engagement signal for switching the clutch to the engaged state when the regenerated electric power is detected by the regenerated electric-power detection means, and outputs, to the clutch drive means, a clutch disengagement signal for switching the clutch to the disengaged state when the regenerated electric power is not detected by the regenerated electric-power detection means.

With this structure, detecting the presence/absence of the regenerated electric power enables automatic switching of the clutch to the engaged state or the disengaged state. Thus, the burden on the operator of the construction machine is reduced.

In the invention, the clutch switching means includes clutch drive means that drives the movable component of the clutch, a clutch switchover switch that is operated by the operator, and a controller that outputs, to the clutch drive means, a clutch engagement signal for switching the clutch to the engaged state when receiving a switch on signal from the clutch switchover switch, and outputs, to the clutch drive means, a clutch disengagement signal for switching the clutch to the disengaged state when receiving a switch off signal from the clutch switchover switch.

With this structure, since the operator of the construction machine is able to switch the clutch to the engaged state or the disengaged state as needed according to the operator's own will, the construction machine is capable of being effectively braked depending on the actual circumstances surrounding the construction machine.

In the present invention, the vehicle body includes a chassis supporting the wheels for running and a machine room rotatably provided on the top of the chassis. The machine room has mounted in it the engine, the hydraulic pump connected directly to the engine, the clutch, a first gear unit provided in the power transmission mechanism and the capacitor. The chassis has mounted in it the motor-generator and a second gear unit provided in the power transmission mechanism, and power transmission between the first gear unit and the second gear unit and electric connection between the capacitor and the motor-generator are established through a swing joint mounted in a connection area between the chassis and the machine room.

With this structure, since the motor-generator is disposed in the chassis, an empty space of the chassis can be effectively used, leading to a reduction in size of the construction machine.

In the present invention, the vehicle body includes a chassis supporting the wheels for running and the machine room rotatably provided on the top of the chassis. The machine room has mounted in it the hydraulic pump. The chassis has mounted in it the engine, a gear unit provided in the power transmission mechanism for transferring power of the engine to the hydraulic pump, the clutch, the capacitor, and the motor-generator, and power transmission between the gear unit and the hydraulic pump is performed through the swing joint mounted in the connection area between the chassis and the machine room.

With this structure, since the engine, clutch, capacitor and the motor-generator are disposed in the chassis, the number of gear units provided in the power transmission mechanism can be reduced to only one. Also, a slip ring for establish electric connection between the capacitor and the motor-generator, and the like can be omitted. Thus, a reduction in cost of the construction machine can be achieved. Also, since many of devices, except for the hydraulic pump, can be disposed on the chassis side, utility space on the machine room side can be widened.

In the present invention, when the clutch is switched to the engaged state by the clutch switching means, a fuel injection system of the engine is controlled to be in a non-injection state.

With this structure, since engine braking can be effectively used to the maximum extent, the braking performance of the construction machine equipped with the parallel hybrid drive unit can be optimized.

In the present invention, a spiral bevel gear unit using a spiral bevel gear is provided as the gear unit.

With this structure, even when the direction of transferring power is changed to a right-angle direction by the gear unit, smooth power transmission can be achieved. Thus, wasted energy can be reduced.

In the present invention, when the clutch is operated to change from the disengaged state to the engaged state by the clutch switching means, an engine speed of the engine is controlled to correspond to a vehicle speed of the vehicle body.

With this structure, the useful life of the clutch can be extended because a large friction force does not act on the clutch, resulting in a construction machine with high endurance.

In the present invention, a controller that monitors a remaining power of a battery of the capacitor is provided, wherein when the remaining power of the battery of the capacitor decreases below a predetermined value, the controller automatically brings the clutch to the engaged state to allow the vehicle body to run by the drive force of the engine.

With this structure, since it is possible to prevent the construction machine from being made inoperable by shortage of the remaining power of the battery, the reliability of the construction machine having the electric running gear can be improved.

Advantageous Effect of Invention

According to the present invention, the clutch is placed in the power transmission mechanism performing power transmission between the engine and the motor-generator, and also the clutch switching means which switch the clutch to the engaged state or the disengaged state is placed. When the clutch switching means is used to switch the clutch to the engaged state, the drive force of the wheels is transferred through the power transmission mechanism to the engine and the hydraulic pump, and the engine braking by the engine and the hydraulic brake force by the hydraulic pump can obtained to reduce the speed of the wheels. As a result, the braking performance of the construction machine including the parallel hybrid drive unit can be enhanced without a motor-generator with large power, thus achieving a size reduction and a cost reduction in this type of construction machines.

DESCRIPTION OF EMBODIMENTS

Embodiments of the construction machine according to the present invention will be described individually below by taking a wheeled excavator as an example.

Embodiment 1

Figure 1:
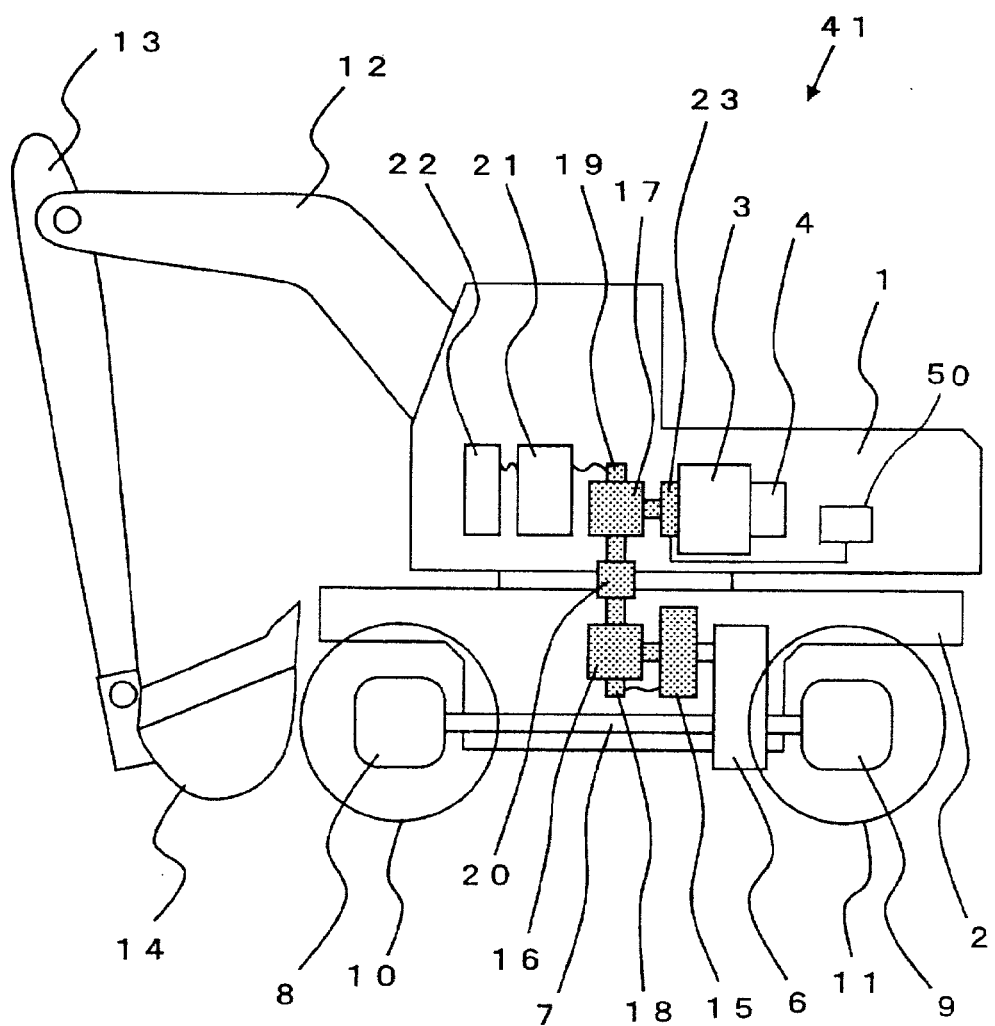
FIG. 1 is an overall structure drawing of a construction machine according to a first embodiment.
Figure 2:
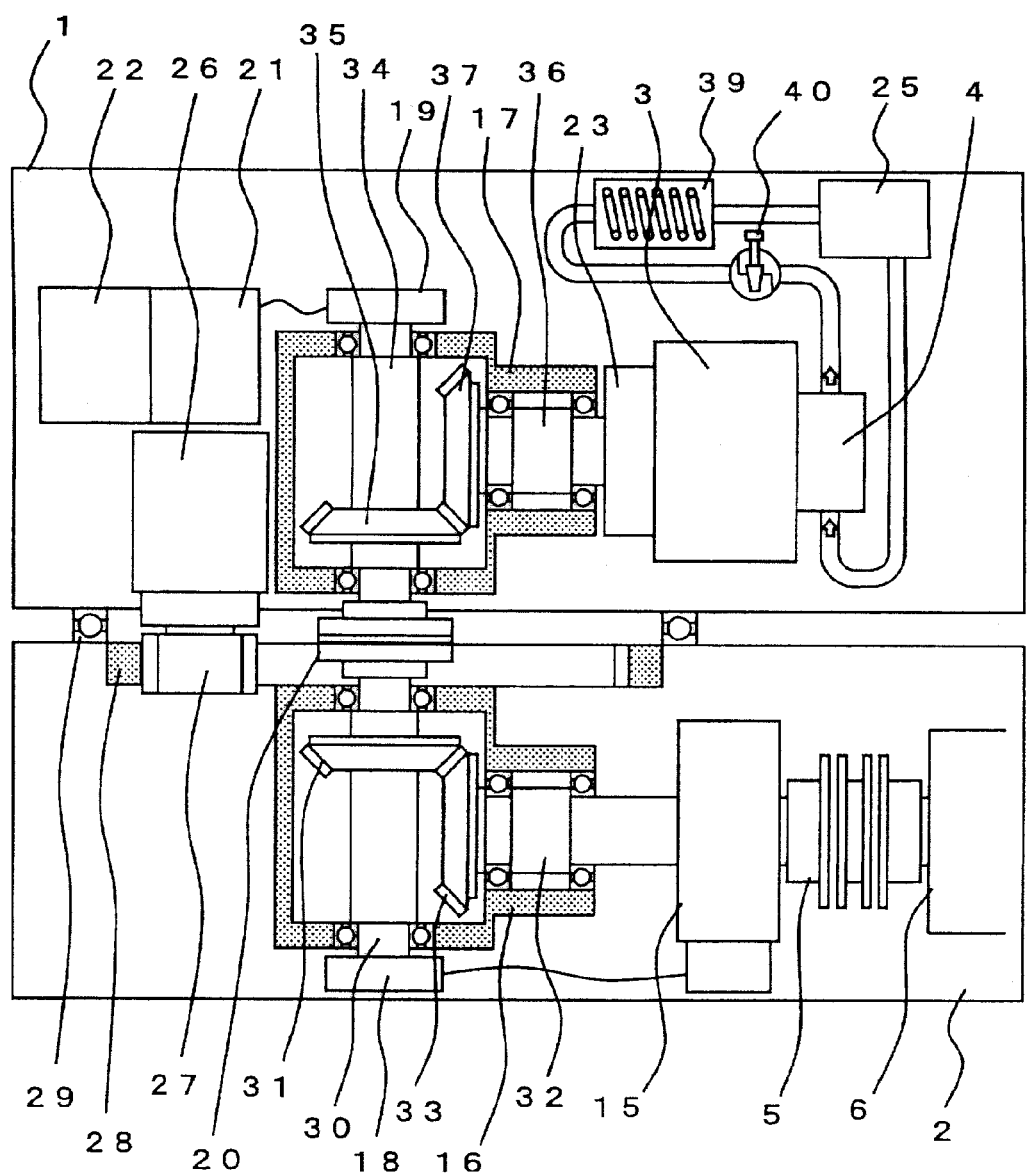
FIG. 2 is an enlarged sectional view of a drive mechanism of the construction machine according to the first embodiment.

As illustrated in FIG. 1 and FIG. 2, a wheeled excavator 41 according to embodiment 1 includes a machine-room-side (first) bevel gear unit 17 which is provided around the rotation center of the machine room 1. The machine-room-side bevel gear unit 17 and an engine 3 are coupled to each other through a clutch 23. A hydraulic pump 4 is connected directly to the engine 3, and a flow control valve 40, an oil cooler 39, and an oil tank 25 are located on piping of the hydraulic pump 4. On the other hand, a chassis-side (second) bevel gear unit 16 is provided directly below the machine-room-side bevel gear unit 17 and in the chassis 2, while the machine-room-side bevel gear unit 17 and the chassis-side bevel gear unit 16 are coupled through a swing joint 20. Also, a running motor-generator 15 is disposed between the chassis-side bevel gear unit 16 and a transmission 6, while the running motor-generator 15 and the transmission 6 are coupled through a shaft joint 5. In addition, the chassis 2 incorporates a propeller shaft 7 extending from the transmission 6 in the fore-and-aft direction of the vehicle body, and a front differential 8 and a rear differential 9 coupled respectively to the front wheels 10 and the rear wheels 11. Accordingly, in the wheeled excavator 41 according to embodiment 1, the machine-room-side bevel gear unit 17, swing joint 20, chassis-side bevel gear unit 16, running motor-generator 15, shaft joint 5, transmission 6, propeller shaft 7, front differential 8 and rear differential 9 form a power transmission mechanism for transferring the power of the engine 3 and the running motor-generator 15 to the front wheels 10 and the rear wheels 11.

Figure 3:
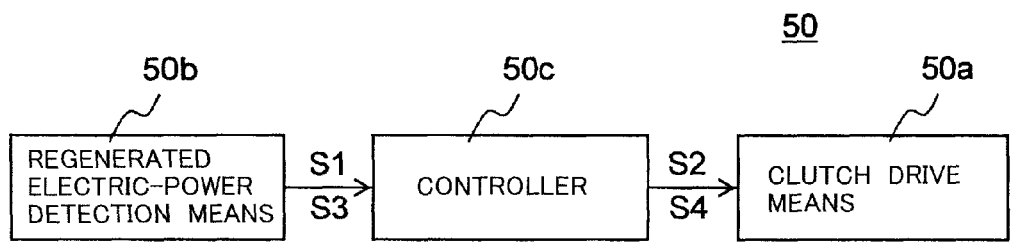
FIG. 3 is a block diagram showing a first example of clutch switching means.

The clutch 23 is provided adjunctively with clutch switching means 50 that switches between an engaged state and a disengaged state. As shown in FIG. 3, the clutch switching means 50 can be structured to include clutch drive means 50a such as a solenoid that drives a movable component of the clutch 23, regenerated electric-power detection means 50b that detects the presence/absence of the regenerated electric power regenerated at the running motor-generator 15, and a controller 50c that outputs, to the clutch drive means 50a, a clutch engagement signal S2 for switching the clutch 23 into the engaged state when receiving a regenerated electric-power detection signal S1 from the regenerated electric-power detection means 50b, and outputs, to the clutch drive means 50a, a clutch disengagement signal S4 for switching the clutch 23 into the disengaged state when receiving a regenerated electric-power non-detection signal S3 from the regenerated electric-power detection means 50b. With this structure, because the regenerated electric-power detection means 50b detects the presence/absence of regenerated electric power, the switching of the clutch 23 to the engaged state or the disengaged state is able to be automatically performed, making it possible to reduce the load on the operator of the construction machine.

Figure 4:
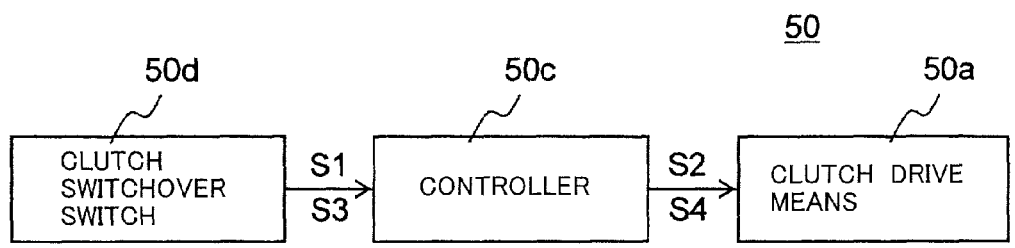
FIG. 4 is a block diagram showing a second example of clutch switching means.

As shown in FIG. 4, the clutch switching means 50 may be also structured to include the clutch drive means 50a such as a solenoid that drives a movable component of the clutch 23, clutch switchover switch 50d that is operated by the operator, and the controller 50c that outputs, to the clutch drive means 50a, a clutch engagement signal S2 for switching the clutch 23 into the engaged state when receiving a switch on signal S5 from the clutch switchover switch 50d, and outputs, to the clutch drive means 50a, a clutch disengagement signal S4 for switching the clutch 23 into the disengaged state when receiving a switch off signal S6 from the clutch switchover switch 50d. With this structure, because the operator of the construction machine is able to switch the clutch 23 to the engaged state or the disengaged state as needed according to the operator's own will, the construction machine is capable of being effectively braked depending on the actual circumstances surrounding the construction machine.

Note that the clutch switching means 50 may be structured such that the regenerated power-electric detection means 50b shown in FIG. 3 and the clutch switchover switch 50d shown in FIG. 4 are connected to the controller 50c.

Figure 7:
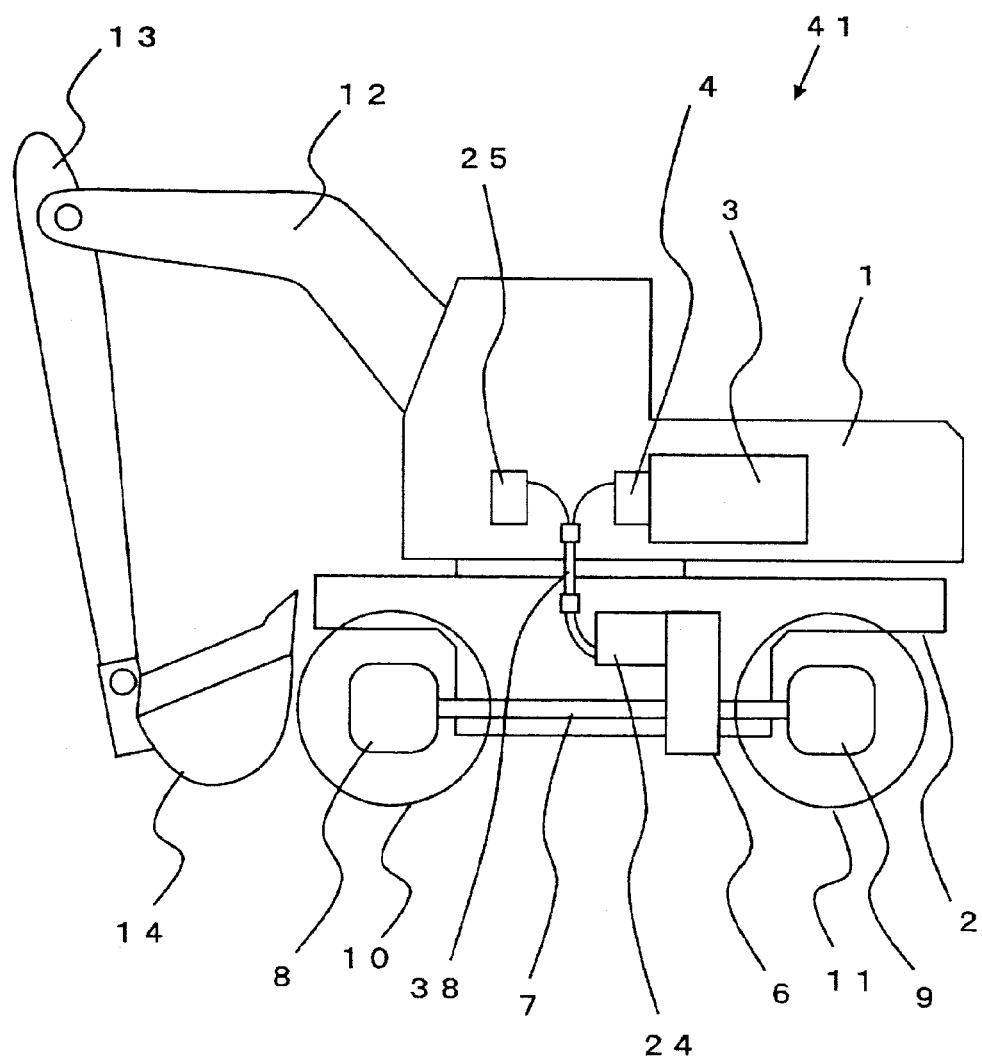
FIG. 7 is a drawing illustrating the structure of a related-art construction machine.

As enlargedly shown in FIG. 2, hollow vertical shafts 30 and 34 are incorporated in the chassis-side bevel gear unit 16 and the machine-room-side bevel gear unit 17, and electric wiring, not shown, extends through the shafts. The electric wiring is connected slip rings 18 and 19 provided at the upper and lower shaft ends of the vertical shafts 30 and 34, thus establishing electrical connection between a battery 22 which is a capacitor and an inverter 21 which are mounted in the machine room 1 and the running motor-generator 15 mounted in the chassis 2. The machine room 1 and the chassis 2 are rotatably coupled to each other via a swing bearing 29. A swing pinion 27, which is mounted on the motor shaft of a swing motor-generator 26 provided in the machine room 1, is engaged with a ring gear 28 provided in the chassis 2. As a result, the swing motor-generator 26 is driven in order to turn the machine room 1 relatively to the chassis 2 in the right or left direction. The other components are identical with those of the related-art wheeled excavator illustrated in FIG. 7, so that the corresponding components are designated with the same signs and a description is omitted.

The wheeled excavator 41 in the embodiment uses pressure oil produced by rotating the hydraulic pump 4 by the engine 3 to drive the boom 12, the arm 13 and the bucket 14 as in the case of the related-art wheeled excavator. In work such as excavation operation conducted by driving these front members, the clutch 23 is in the disengaged state and also the running motor-generator 15 is capable of rotating independently of the engine 3 and the hydraulic pump 4. Because of this, the running motor-generator 15 can be rotated by the electric power from the battery 22 in order for the wheeled excavator 41 to freely run.

For running on a level road for movement, the wheeled excavator 41 runs while the clutch 23 is disengaged and the running motor-generator 15 is rotated by the electric power from the battery 22. During deceleration, the running motor-generator 15 is operated to function as the generator, so that the braking power is collected as electric power and flowed back to the battery 22. This enables running in low power consumption. When the remaining power of the battery 22 becomes low, the engine 3 is started and the clutch 23 is switched to the engaged state. As a result, the wheeled excavator 41 can run without consumption of electric power of the battery 22. In this case, the hydraulic pump 4 rotates simultaneously, so that the flow control valve 40 is in the full open position so as to minimize the rotation resistance of the pump. Because the turning moment produced by the power transmission is applied to the machine room, a turning brake, not shown, must be engaged so as to prevent the machine room from turning.

When the wheeled excavator 41 runs on a long downhill, heavy vehicle weight makes use of a friction brake basically impossible. For this reason, there is a need to use a running motor to adjust the speed. In this case, in the present invention, the engine 3 is started, and then the clutch 23 is in the engaged state, so that engine braking is used to perform deceleration operation. For reference sake, if the clutch 23 is engaged while the engine speed and the vehicle speed are not matched with each other, the clutch 23 may be possibly burnt by frictional heat. To avoid this, the engine speed of the engine 3 is adjusted to be brought into rough synchronism with the rotational speed of the horizontal shaft 36, before the clutch 23 is engaged. When the engine speed of the engine 3 is sufficiently high, engine braking has strong effect, so that the flow control valve 40 is kept in the full open position. However, if the vehicle speed decreases and the engine speed of the engine 3 decreases, the efficacy of engine braking is degraded. To address this, the flow control valve 40 can be controlled to be closed so as to reduce the flow rate of pressure oil, and then the oil pressure thus generated can be used to produce a braking effect. In this case, if the fuel injection system of the engine 3 is brought to a non-injection state, the fuel consumption can be reduced. In addition, the pressure oil flows through the flow control valve 40, thereby raising the temperature of the pressure oil. To address this, an already-existing oil cooler 39 used in work is actuated to decrease the temperature of the pressure oil. The structure and operation as described above make it possible to provide a desired braking force continually even on a long downhill.

Note that unlike the engine 3, the motor-generator 15 can be easily rotated in the reverse direction, so that the structure does not require a reverse gear provided in the transmission 6. However, since it is a fundamental principle that the wheeled excavator 41 moves forward when the clutch 23 is engaged and the engine 3 and the oil pump 4 are connected, when it moves backward, an interlock for preventing the clutch 23 from being engaged, warning light for alerting the operator, and/or the like are required.

Embodiment 2

Figure 5:
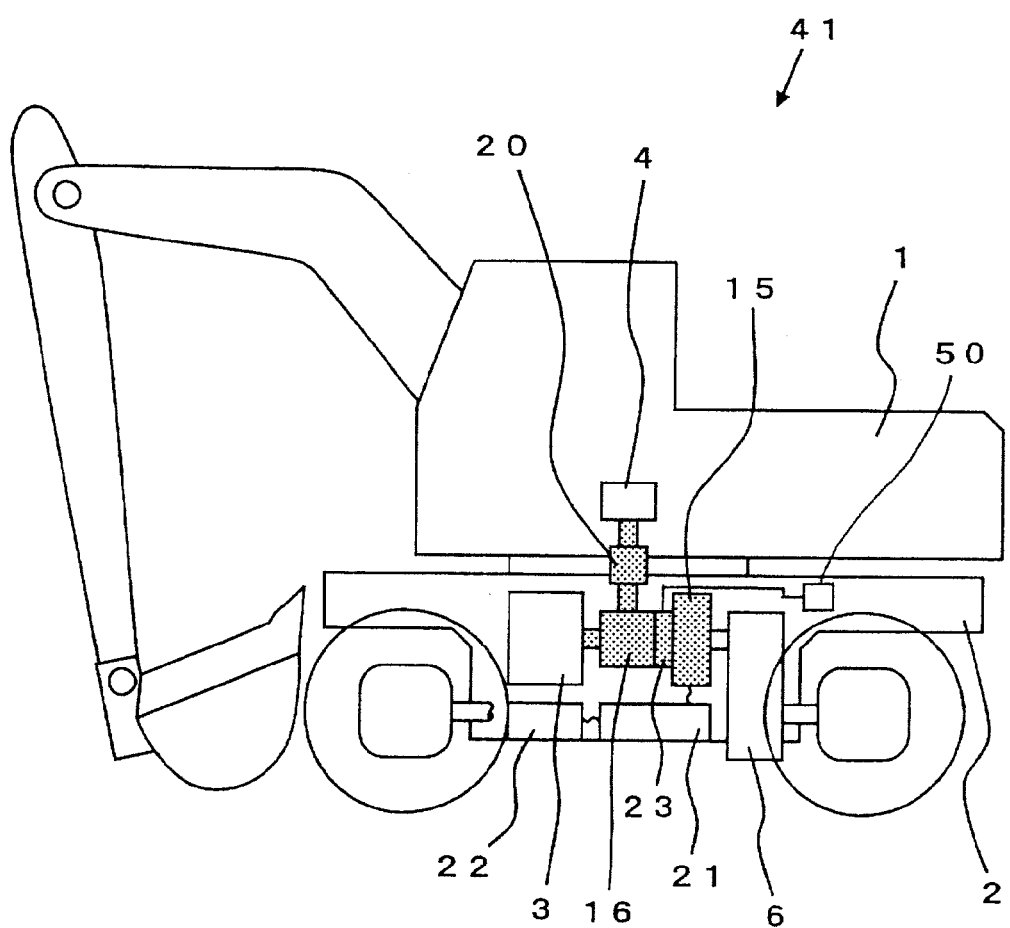
FIG. 5 is an overall structure drawing of a construction machine according to a second embodiment.
Figure 6:
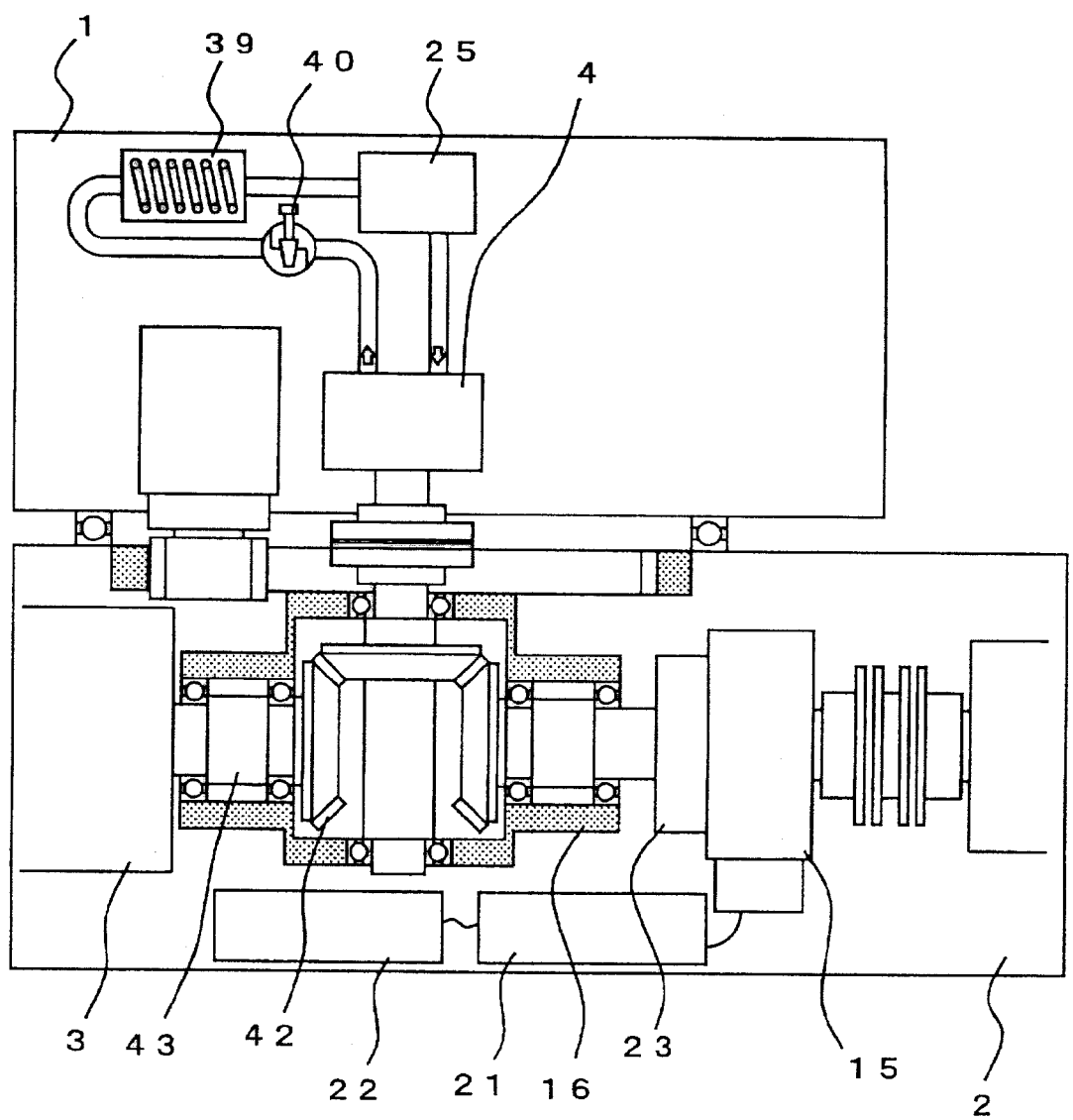
FIG. 6 is an enlarged sectional view of a drive mechanism of the construction machine according to the second embodiment.

As illustrated in FIG. 5 and FIG. 6, the wheeled excavator 41 according to embodiment 2 includes the hydraulic pump 4 provided around the rotation center of the machine room 1, and the chassis-side bevel gear unit 16 provided directly below the hydraulic pump 4 and in the chassis 2. The hydraulic pump 4 and the chassis-side bevel gear unit 16 are coupled to each other through the swing joint 20. The chassis-side bevel gear unit 16 is connected through the clutch 23 to the running motor-generator 15 coupled to the transmission 6. Further, the engine 3 is disposed on the opposite side of the chassis-side bevel gear unit 16 to the running motor-generator 15, and connected to the chassis-side bevel gear unit 16 through the input shaft 43 and the input-shaft gear 42. The battery 22 and the inverter 21 are placed on the bottom of the chassis 2 and electrically connected to the running motor-generator 15. The other components are the same as those in the wheeled excavator according to embodiment 1, so that the corresponding components are designated with the same signs, and a description is omitted.

In the above structure, upon start of the engine 3, the hydraulic pump 4 located in the machine room 1 is rotated through the chassis-side bevel gear unit 16 and the swing joint 20 to supply pressure oil. This makes it possible to perform work absolutely as in the case of the related-art wheeled excavator. At this stage, as in the case of embodiment 1, the wheeled excavator is capable of freely running by disengaging the clutch 23 and rotating the running motor-generator 15 with the electric power from the battery 22 and the inverter 21. In a level-road run and a downhill run, the same functions as those in embodiment 1 can be provided by controlling the switching of the clutch 23 in like manner with embodiment 1.

If the structure as described above is employed, the need arise to mount a not-shown swing battery in the machine room 1 for an electric supply to the swing motor-generator 26. However, the need to supply electric-power to the running motor-generator 15 through the slip ring is eliminated and also the machine-room-side bevel gear unit becomes unnecessary. As a result, a significant reduction in cost is made possible.

REFERENCE SIGN LIST

1 ... Machine room
2 ... Chassis
3 ... Engine
4 ... Hydraulic pump
5 ... Shaft joint
6 ... Transmission
7 ... Propeller shaft
8 ... Front differential
9 ... Rear differential
10 ... Front wheel
11 ... Rear wheel
12 ... Boom
13 ... Arm
14 ... Bucket
15 ... Running motor-generator
16 ... Chassis-side bevel gear unit
17 ... Machine-room-side bevel gear unit
18 ... Chassis-side slip ring
19 ... Machine-room-side slip ring
20 ... Swing joint
21 ... Inverter
22 ... Battery
23 ... Clutch
24 ... Running hydraulic motor
25 ... Oil tank
26 ... Swing motor-generator
27 ... Swing pinion 28 ... Ring gear
29 ... Swing bearing
30/34 ... Vertical shaft
32/36 ... Horizontal shaft
31/35 ... vertical-shaft gear
33/37 ... Horizontal-shaft gear
38 ... piping joint
39 ... Oil cooler
40 ... Flow control valve
41 ... Wheeled excavator
42 ... Input-shaft gear
43 ... Input shaft

The invention claimed is:

1. A construction machine comprising:
wheels for running which are mounted on a vehicle body;
an engine;
a motor-generator having two functions as a generator and a motor;
a capacitor electrically connected to the motor-generator;
a hydraulic pump driven by the engine; and
a power transmission mechanism that performs power transmission between the engine and the motor-generator, power transmission between the motor-generator and the wheels, and power transmission between the engine and the hydraulic pump,
wherein: the power transmission mechanism that performs the power transmission between the engine and the motor-generator includes a clutch and clutch switching means that switches the clutch between an engaged state and a disengaged state; and
when the clutch switching means is used to switch the clutch to the engaged state, a drive force of the wheels is transferred to the engine and the hydraulic pump through the power transmission mechanism, so that engine braking by the engine and a hydraulic brake force by the hydraulic pump are obtained for deceleration of the wheels.

2. The construction machine according to claim 1, wherein the clutch switching means includes:
clutch drive means that drives a movable component of the clutch;
regenerated electric-power detection means that detects the presence/absence of regenerated electric power regenerated at the motor-generator; and
a controller that outputs, to the clutch drive means, a clutch engagement signal for switching the clutch to the engaged state when the regenerated electric power is detected by the regenerated electric-power detection means, and outputs, to the clutch drive means, a clutch disengagement signal for switching the clutch to the disengaged state when the regenerated electric power is not detected by the regenerated electric-power detection means.

3. The construction machine according to claim 1, wherein the clutch switching means includes:
the clutch drive means that drives the movable component of the clutch;
a clutch switchover switch that is operated by an operator; and
a controller that outputs, to the clutch drive means, a clutch engagement signal for switching the clutch to the engaged state when receiving a switch on signal from the clutch switchover switch, and outputs, to the clutch drive means, a clutch disengagement signal for switching the clutch to the disengaged state when receiving a switch off signal from the clutch switchover switch.

4. The construction machine according to claim 1,
wherein: the vehicle body includes a chassis supporting the wheels for running and a machine room rotatably provided on the top of the chassis;
the machine room has mounted in it the engine, the hydraulic pump connected directly to the engine, the clutch, a first gear unit provided in the power transmission mechanism and the capacitor;
the chassis has mounted in it the motor-generator and a second gear unit provided in the power transmission mechanism; and
power transmission between the first gear unit and the second gear unit and electric connection between the capacitor and the motor-generator are established through a swing joint mounted in a connection area between the chassis and the machine room.

5. The construction machine according to claim 1,
wherein: the vehicle body includes a chassis supporting the wheels for running and the machine room rotatably provided on the top of the chassis;
the machine room has mounted in it the hydraulic pump;
the chassis has mounted in it the engine, a gear unit provided in the power transmission mechanism for transferring power of the engine to the hydraulic pump, the clutch, the capacitor, and the motor-generator; and
power transmission between the gear unit and the hydraulic pump is performed through the swing joint mounted in the connection area between the chassis and the machine room.

6. The construction machine according to claim 1, wherein when the clutch is switched to the engaged state by the clutch switching means, a fuel injection system of the engine is controlled to be in a non-injection state.

7. The construction machine according to claim 1, wherein a spiral bevel gear unit using a spiral bevel gear is provided as the gear unit.

8. The construction machine according to claim 1, wherein when the clutch is operated to change from the disengaged state to the engaged state by the clutch switching means, an engine speed of the engine is controlled to correspond to a vehicle speed of the vehicle body.

9. The construction machine according to claim 1, further comprising a controller that monitors a remaining power of a battery of the capacitor, wherein when the remaining power of the battery of the capacitor decreases below a predetermined value, the controller automatically brings the clutch to the engaged state to allow the vehicle body to run by the drive force of the engine.

* * * * *